US012791974B2

(12) United States Patent
Okamoto et al.

(10) Patent No.: US 12,791,974 B2
(45) Date of Patent: Nov. 10, 2026

(54) SHEET CONVEYING DEVICE CAPABLE OF DETERMINING WHETHER OR NOT DELAY HAS OCCURRED IN SUPPLY OF SHEET BY SHEET SUPPLY PORTION WITHOUT USING ADDITIONAL SENSOR, AN IMAGE FORMING APPARATUS, AND DETERMINATION METHOD

(71) Applicant: KYOCERA Document Solutions Inc., Osaka (JP)

(72) Inventors: Sueaki Okamoto, Osaka (JP); Yuta Kitabayashi, Osaka (JP); Yuji Toyota, Osaka (JP); Yuji Kamiyama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/246,214

(22) Filed: Jun. 23, 2025

(65) Prior Publication Data

US 2025/0390051 A1 Dec. 25, 2025

(30) Foreign Application Priority Data

Jun. 25, 2024 (JP) ................................ 2024-102057

(51) Int. Cl.
*B65H 7/06* (2006.01)
*B65H 3/06* (2006.01)
*G03G 15/00* (2006.01)

(52) U.S. Cl.
CPC ..... *G03G 15/6558* (2013.01); *G03G 15/6511* (2013.01); *G03G 2215/00599* (2013.01); *G03G 2215/00721* (2013.01)

(58) Field of Classification Search
CPC .. B65H 2513/50; B65H 2513/52; B65H 3/06; B65H 3/0684; B65H 7/06; G03G 2215/00599; G03G 15/6511
See application file for complete search history.

(56) References Cited

U.S. PATENT DOCUMENTS 9,802,778 B2 10/2017 Isobe et al.

FOREIGN PATENT DOCUMENTS

JP 2020132413 A 8/2020
JP 2024042293 A 3/2024

OTHER PUBLICATIONS

European Patent Office, Extended European Search Report Issued in Application No. 25184606.9, Nov. 13, 2025, Germany, 8 pages.

*Primary Examiner* — Luis A Gonzalez
(74) *Attorney, Agent, or Firm* — Alleman Hall LLP

(57) ABSTRACT

A sheet conveying device includes a sheet supply portion, a measurement processing portion, a first determination processing portion, and a second determination processing portion. The sheet supply portion supplies an uppermost sheet in a stack of sheets lifted by a lift portion to a conveying path. The measurement processing portion measures, every time the sheet is supplied, an elapsed time from a start of supply of the sheet to a time when the sheet is detected by a detection portion. The first determination processing portion determines, every time the elapsed time is measured, whether or not a measured measurement time is less than a reference time. The second determination processing portion determines, when it is continuously determined that the measurement time is less than the reference time, whether or not a delay has occurred in the supply of the sheet.

4 Claims, 9 Drawing Sheets

SHEET CONVEYING DEVICE CAPABLE OF DETERMINING WHETHER OR NOT DELAY HAS OCCURRED IN SUPPLY OF SHEET BY SHEET SUPPLY PORTION WITHOUT USING ADDITIONAL SENSOR, AN IMAGE FORMING APPARATUS, AND DETERMINATION METHOD

INCORPORATION BY REFERENCE

This application is based upon and claims the benefit of priority from the corresponding Japanese Patent Application No. 2024-102057 filed on Jun. 25, 2024, the entire contents of which are incorporated herein by reference.

BACKGROUND

The present disclosure relates to a sheet conveying device, an image forming apparatus, and a determination method.

An image forming apparatus such as a multifunction peripheral includes a sheet conveying device which conveys a sheet on which an image is to be formed. For example, the sheet conveying device includes a lift portion, a sheet supply portion, and a detection portion. The lift portion lifts a stack of sheets. The sheet supply portion includes a conveying member which rotates while being in contact with an upper surface of the stack of sheets lifted by the lift portion, and supplies the sheet that comes into contact with the conveying member to a conveying path. The detection portion detects the sheet supplied by the sheet supply portion on the conveying path.

Further, the sheet conveying device which measures a conveying speed of the sheet by the sheet supply portion using the detection portion is known.

SUMMARY

A sheet conveying device according to an aspect of the present disclosure includes a lift portion, a sheet supply portion, a detection portion, a measurement processing portion, a first determination processing portion, and a second determination processing portion. The lift portion lifts a stack of sheets. The sheet supply portion includes a conveying member which rotates while being in contact with an upper surface of the stack of sheets lifted by the lift portion, and supplies a sheet that comes into contact with the conveying member to a conveying path. The detection portion detects the sheet supplied by the sheet supply portion on the conveying path. The measurement processing portion measures, every time the sheet is supplied by the sheet supply portion, an elapsed time from a start of supply of the sheet by the sheet supply portion to a time when the sheet is detected by the detection portion. The first determination processing portion determines, every time the elapsed time is measured by the measurement processing portion, whether or not a measurement time measured by the measurement processing portion is less than a predetermined reference time. The second determination processing portion determines, when it is continuously determined by the first determination processing portion that the measurement time is less than the reference time, whether or not a delay has occurred in the supply of the sheet by the sheet supply portion based on a first measurement time that has been measured last out of a plurality of the measurement times that have been measured after a time when it has been lastly determined by the first determination processing portion that the measurement time is not less than the reference time and a second measurement time that is shortest out of rest of the measurement times excluding the first measurement time.

An image forming apparatus according to another aspect of the present disclosure includes the sheet conveying device and an image forming portion. The image forming portion forms an image on the sheet conveyed by the sheet conveying device.

A determination method according to another aspect of the present disclosure is executed in a sheet conveying device including a lift portion which lifts a stack of sheets, a sheet supply portion which includes a conveying member which rotates while being in contact with an upper surface of the stack of sheets lifted by the lift portion, and supplies a sheet that comes into contact with the conveying member to a conveying path, and a detection portion which detects the sheet supplied by the sheet supply portion on the conveying path, and includes a measurement step, a first determination step, and a second determination step. The measurement step includes measuring, every time the sheet is supplied by the sheet supply portion, an elapsed time from a start of supply of the sheet by the sheet supply portion to a time when the sheet is detected by the detection portion. The first determination step includes determining, every time the elapsed time is measured in the measurement step, whether or not a measurement time measured in the measurement step is less than a predetermined reference time. The second determination step includes determining, when it is continuously determined in the first determination step that the measurement time is less than the reference time, whether or not a delay has occurred in the supply of the sheet by the sheet supply portion based on a first measurement time that has been measured last out of a plurality of the measurement times that have been measured after a time when it has been lastly determined in the first determination step that the measurement time is not less than the reference time and a second measurement time that is shortest out of rest of the measurement times excluding the first measurement time.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the attached drawings. It is noted that the following embodiment is an example of embodying the present disclosure and does not limit the technical scope of the present disclosure.

[Configuration of Image Forming Apparatus 100]

Figure 1:
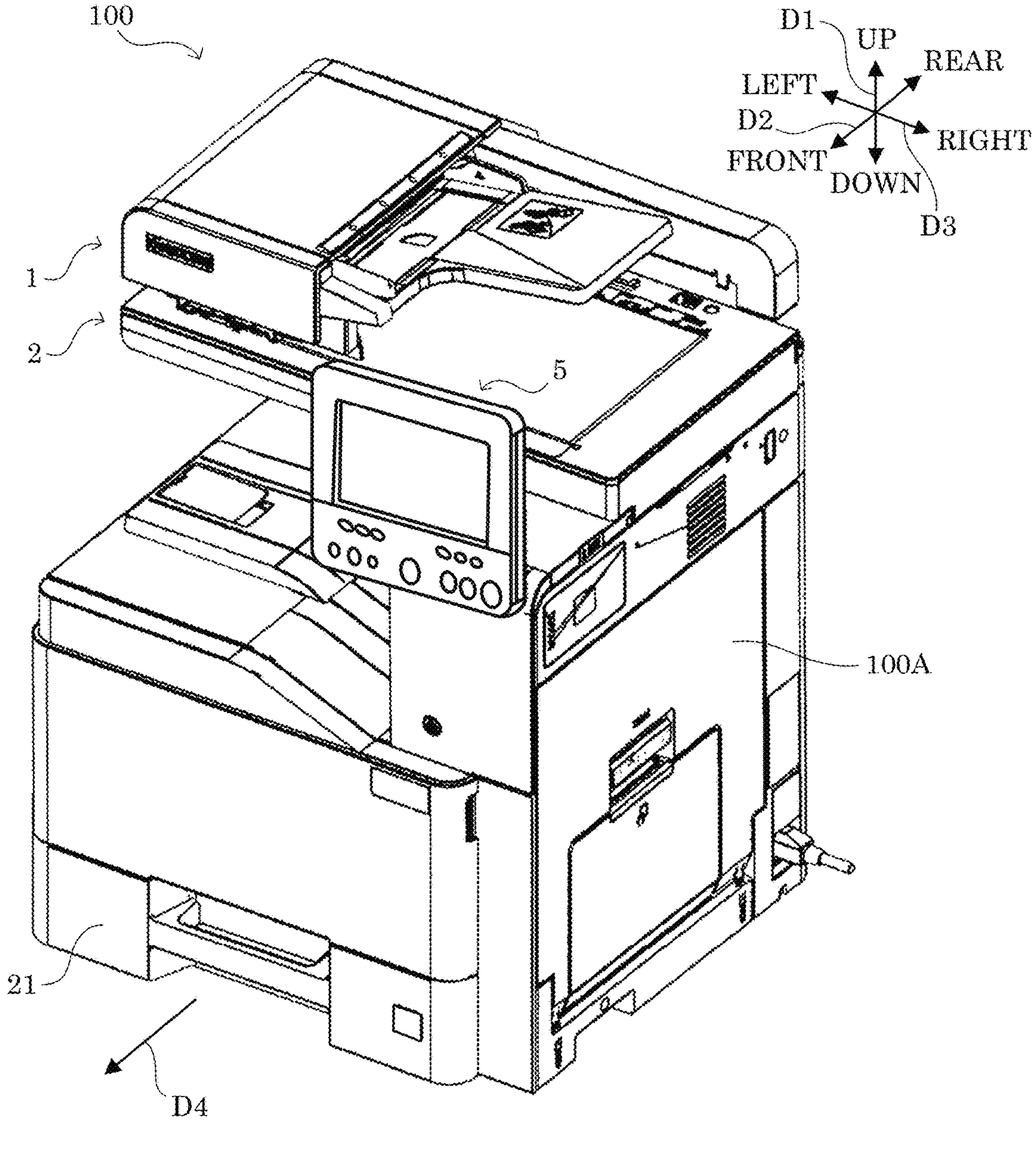
FIG. 1 is a diagram showing an outer appearance of an image forming apparatus according to an embodiment of the present disclosure.
Figure 2:
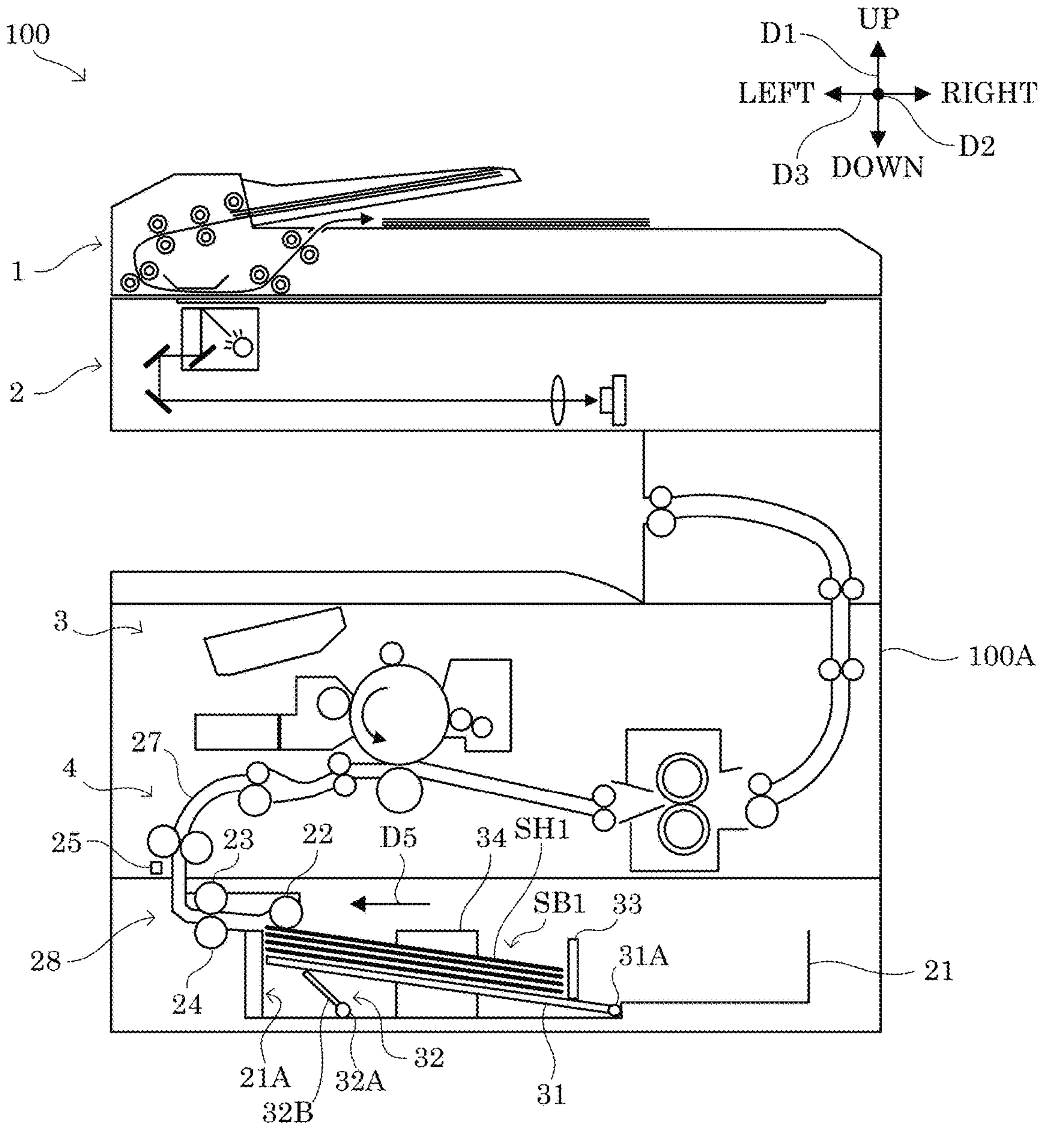
FIG. 2 is a diagram showing an internal configuration of the image forming apparatus according to the embodiment of the present disclosure.

First, a configuration of an image forming apparatus 100 according to an embodiment of the present disclosure will be described with reference to FIG. 1 to FIG. 4. Herein, FIG. 1 is a perspective view showing an outer appearance of the image forming apparatus 100. Further, FIG. 2 is a cross-sectional view showing an internal configuration of the image forming apparatus 100. Furthermore, FIG. 4 is an enlarged view of a sheet supply portion 28 shown in FIG. 2.

It is noted that for convenience of descriptions, a vertical direction in a state where the image forming apparatus 100 is installed in a usable state (a state shown in FIG. 1) is defined as an up-down direction D1. In addition, a front-rear direction D2 is defined with a surface of the image forming apparatus 100 on a near left side of a sheet surface shown in FIG. 1 being a front surface (front side). In addition, a left-right direction D3 is defined using the front surface of the image forming apparatus 100 in the installed state as a reference.

The image forming apparatus 100 is a multifunction peripheral having a plurality of functions such as a scanning function, a printing function, a facsimile function, and a copying function. It is noted that the present disclosure may also be applied to image forming apparatuses such as a printer, a facsimile apparatus, and a copying machine.

Figure 3:
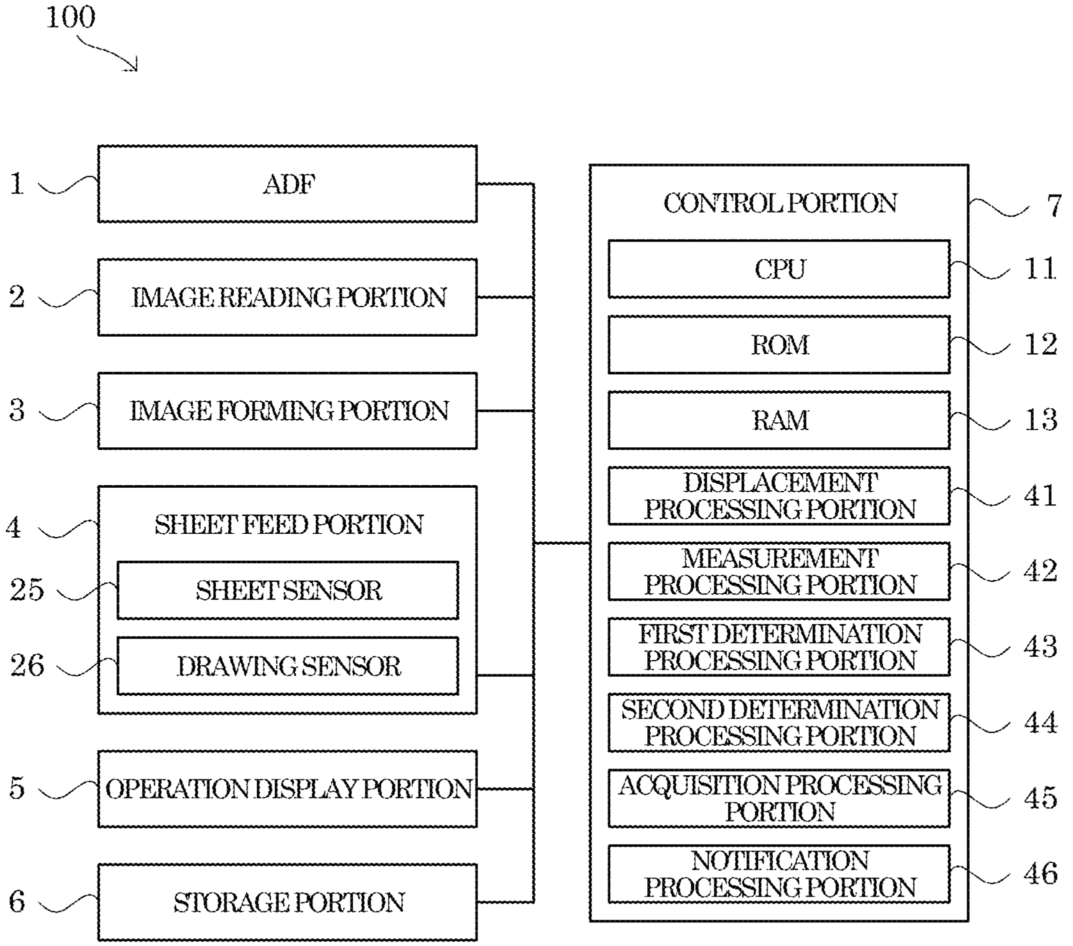
FIG. 3 is a block diagram showing a system configuration of the image forming apparatus according to the embodiment of the present disclosure.
Figure 4:
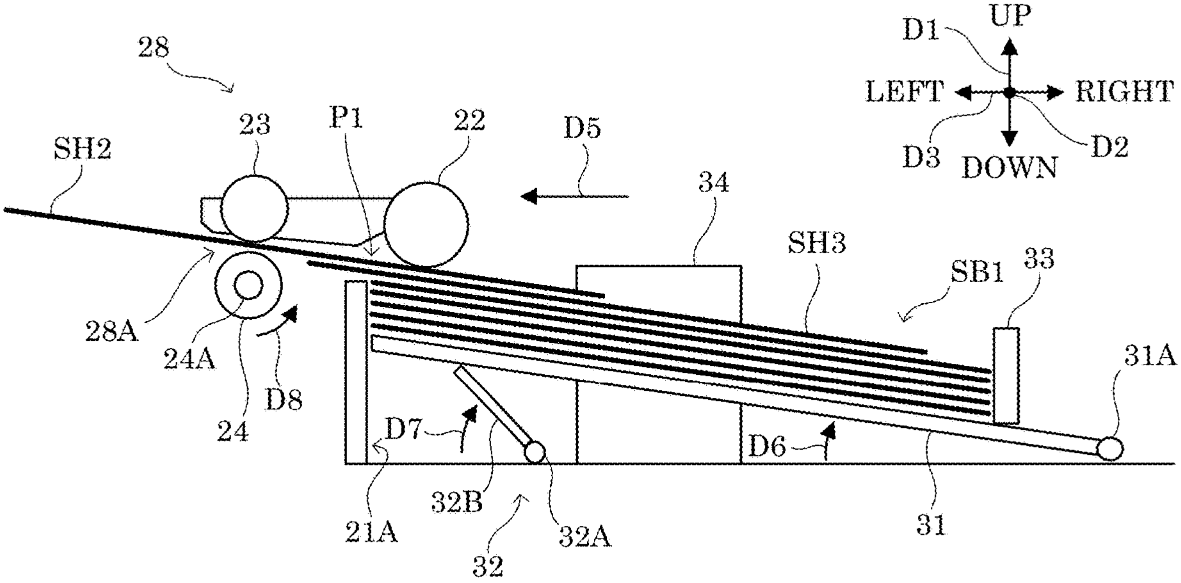
FIG. 4 is a diagram showing a configuration of a sheet supply portion in the image forming apparatus according to the embodiment of the present disclosure.

As shown in FIG. 3, the image forming apparatus 100 includes an ADF (Auto Document Feeder) 1, an image reading portion 2, an image forming portion 3, a sheet feed portion 4, an operation display portion 5, a storage portion 6, and a control portion 7.

The image forming portion 3, the sheet feed portion 4, the storage portion 6, and the control portion 7 are housed in a housing 100A (see FIG. 1 and FIG. 2) of the image forming apparatus 100. The housing 100A is formed in a substantially rectangular parallelepiped shape. The ADF 1 and the image reading portion 2 are provided on an upper side of the housing 100A (see FIG. 1 and FIG. 2). The operation display portion 5 is provided on a front side of the housing 100A (see FIG. 1).

The ADF 1 conveys a document sheet from which an image is to be read by the image reading portion 2. The ADF 1 includes a document sheet setting portion, a plurality of conveying rollers, a document sheet holder, and a sheet discharge portion.

The image reading portion 2 reads an image of a document sheet. That is, the image reading portion 2 realizes the scanning function. The image reading portion 2 includes a document sheet table, a light source, a plurality of mirrors, an optical lens, and a CCD (Charge Coupled Device).

The image forming portion 3 forms an image that is based on image data on a sheet SH1 (see FIG. 2) supplied from the sheet feed portion 4. That is, the image forming portion 3 realizes the printing function. Specifically, the image forming portion 3 forms an image using electrophotography. The image forming portion 3 includes a photoconductor drum, a charging device, a laser scanning unit (LSU), a developing device, a transfer device, a cleaning device, and a fixing device.

The operation display portion 5 is a user interface of the image forming apparatus 100. The operation display portion 5 includes a display portion and an operation portion. The display portion displays various types of information in response to control instructions from the control portion 7. For example, the display portion is a flat panel display such as a liquid crystal display. The operation portion is used to input various types of information to the control portion 7 according to user operations. For example, the operation portion includes an operation key and a touch panel.

The storage portion 6 is a nonvolatile storage device. For example, the storage portion 6 is a nonvolatile memory such as a flash memory.

The control portion 7 collectively controls the image forming apparatus 100. As shown in FIG. 3, the control portion 7 includes a CPU 11, a ROM 12, and a RAM 13. The CPU 11 is a processor that executes various types of arithmetic processing. The ROM 12 is a nonvolatile storage device in which information such as control programs for causing the CPU 11 to execute various types of processing is stored in advance. The RAM 13 is a volatile or nonvolatile storage device that is used as a temporary storage memory (working area) for the various types of processing to be executed by the CPU 11. In the control portion 7, the CPU 11 executes the various control programs stored in advance in the ROM 12. Thus, the control portion 7 collectively controls the image forming apparatus 100. It is noted that the control portion 7 may be constituted of an electronic circuit such as an integrated circuit (ASIC). Alternatively, the control portion 7 may be a control portion provided separately from a main control portion that collectively controls the image forming apparatus 100.

The sheet feed portion 4 supplies a sheet SH1 (see FIG. 2) to the image forming portion 3.

As shown in FIG. 2 and FIG. 3, the sheet feed portion 4 includes a sheet feed cassette 21, a pickup roller 22, a sheet feed roller 23, a separation roller 24, a sheet sensor 25, a drawing sensor 26, and a conveying path 27.

A stack of sheets SB1 (see FIG. 2) is placed in the sheet feed cassette 21. For example, the stack of sheets SB1 including the sheets SH1 such as paper, coated paper, postcards, envelopes, and OHP sheets is placed in the sheet feed cassette 21. As shown in FIG. 1 and FIG. 2, the sheet feed cassette 21 is provided at a bottom portion of the housing 100A. In addition, the sheet feed cassette 21 is provided so as to be capable of being drawn out from the housing 100A in a drawing direction D4 (see FIG. 1) along the front-rear direction D2.

As shown in FIG. 2, the sheet feed cassette 21 includes a lift plate 31, a lifting and lowering mechanism 32, an end cursor 33, and a pair of side cursors 34.

The lift plate 31 lifts up the stack of sheets SB1 (see FIG. 2) placed in the sheet feed cassette 21. The lift plate 31 is a flat plate-like member provided at the bottom portion of the sheet feed cassette 21. The stack of sheets SB1 is placed on an upper surface of the lift plate 31. The lift plate 31 is provided to be rotatable about a rotation shaft 31A (see FIG. 2) extending in the front-rear direction D2. Specifically, a right end portion of the lift plate 31 is supported rotatably about the rotation shaft 31A. The lift plate 31 is an example of a lift portion according to the present disclosure.

The lifting and lowering mechanism 32 lifts and lowers the lift plate 31. As shown in FIG. 2, the lifting and lowering mechanism 32 includes a rotation shaft 32A and a push-up plate 32B. The rotation shaft 32A extends in the front-rear direction D2. The push-up plate 32B is provided to extend from the rotation shaft 32A toward a direction orthogonal to the extension direction of the rotation shaft 32A. The push-up plate 32B is formed in a flat plate shape that is elongated in the front-rear direction D2. The rotation shaft 32A and the push-up plate 32B are provided below the lift plate 31.

A rear end portion of the rotation shaft 32A is coupled to a motor (not shown) provided outside the sheet feed cassette 21 via a joint portion (not shown) provided outside the sheet feed cassette 21. Upon receiving a rotational driving force supplied from the motor via the joint portion, the rotation shaft 32A and the push-up plate 32B rotate in a second rotation direction D7 shown in FIG. 4. When the rotation shaft 32A and the push-up plate 32B rotate in the second rotation direction D7, the lift plate 31 is pushed up by the push-up plate 32B to thus rotate in a first rotation direction D6 (see FIG. 4) shown in FIG. 4. Thus, the stack of sheets SB1 placed on the upper surface of the lift plate 31 is lifted upwardly.

The joint portion is restricted from rotating in a direction opposite to the second rotation direction D7. For example, the joint portion includes a ratchet mechanism that restricts the joint portion from rotating in the direction opposite to the second rotation direction D7. By restricting the joint portion from rotating in the direction opposite to the second rotation direction D7, the rotation of the rotation shaft 32A engaged with the joint portion in the direction opposite to the second rotation direction D7 is also restricted. This restricts lowering of the lift plate 31 by its own weight.

When the sheet feed cassette 21 is drawn out from the housing 100A in the drawing direction D4, the engagement between the rotation shaft 32A and the joint portion is released. Thus, the restriction of the rotation of the rotation shaft 32A and the push-up plate 32B in the direction opposite to the second rotation direction D7 by the joint portion is released, and the lift plate 31 is lowered by its own weight.

The end cursor 33 is provided so as to be movable along a sheet conveying direction D5 shown in FIG. 4. The end cursor 33 causes the stack of sheets SB1 placed in the sheet feed cassette 21 to abut against a wall surface 21A (see FIG. 4) of the sheet feed cassette 21 on a downstream side of the sheet conveying direction D5, to adjust a position of the stack of sheets SB1 in the sheet conveying direction D5. The pair of side cursors 34 are provided to interlock with each other so as to approach or move away from each other along a width direction of the sheet SH1 orthogonal to the sheet conveying direction D5. The pair of side cursors 34 sandwich and hold the stack of sheets SB1 placed in the sheet feed cassette 21 to adjust the position of the sheets SH1 in the width direction.

As shown in FIG. 2 and FIG. 4, the pickup roller 22 is provided above the lift plate 31. The pickup roller 22 rotates while being in contact with the upper surface of the stack of sheets SB1 lifted by the lift plate 31, thereby conveying an uppermost sheet SH1 (see FIG. 2) in the stack of sheets SB1 to a separation portion 28A (see FIG. 4). Herein, the separation portion 28A is a nip portion formed between the sheet feed roller 23 and the separation roller 24. The pickup roller 22 conveys the sheet SH1 in the sheet conveying direction D5 (see FIG. 4). The sheet conveying direction D5 is a direction orthogonal to the front-rear direction D2. The pickup roller 22 is an example of a conveying member according to the present disclosure.

Specifically, the pickup roller 22 is provided to be rotatable about a shaft extending in the front-rear direction D2. The pickup roller 22 rotates by receiving a rotational driving force supplied from a motor (not shown) while being in contact with the upper surface of the sheet SH1. Thus, the pickup roller 22 applies a conveying force in the sheet conveying direction D5 to the sheet SH1 in contact with the pickup roller 22.

The pickup roller 22, the sheet feed roller 23, and the separation roller 24 constitute the sheet supply portion 28 (see FIG. 2 and FIG. 4) that supplies the sheet SH1 in contact with the pickup roller 22 to the conveying path 27 (see FIG. 2). The conveying path 27 is a movement path of the sheet SH1 that is provided from the sheet supply portion 28 to the image forming portion 3.

As shown in FIG. 2 and FIG. 4, the sheet feed roller 23 is provided more on the downstream side of the sheet conveying direction D5 than the pickup roller 22. The sheet feed roller 23 comes into contact with the upper surface of the sheet SH1 (see FIG. 2) conveyed by the pickup roller 22 and conveys the sheet SH1 beyond a detection position of the sheet SH1 by the sheet sensor 25 (see FIG. 2). The sheet feed roller 23 conveys the sheet SH1 in the sheet conveying direction D5.

Specifically, the sheet feed roller 23 is provided to be rotatable about a shaft extending in the front-rear direction D2. The sheet feed roller 23 rotates by receiving a rotational driving force supplied from a motor (not shown) while being in contact with the upper surface of the sheet SH1. Thus, the sheet feed roller 23 applies a conveying force in the sheet conveying direction D5 to the sheet SH1 in contact with the sheet feed roller 23.

Figure 9:
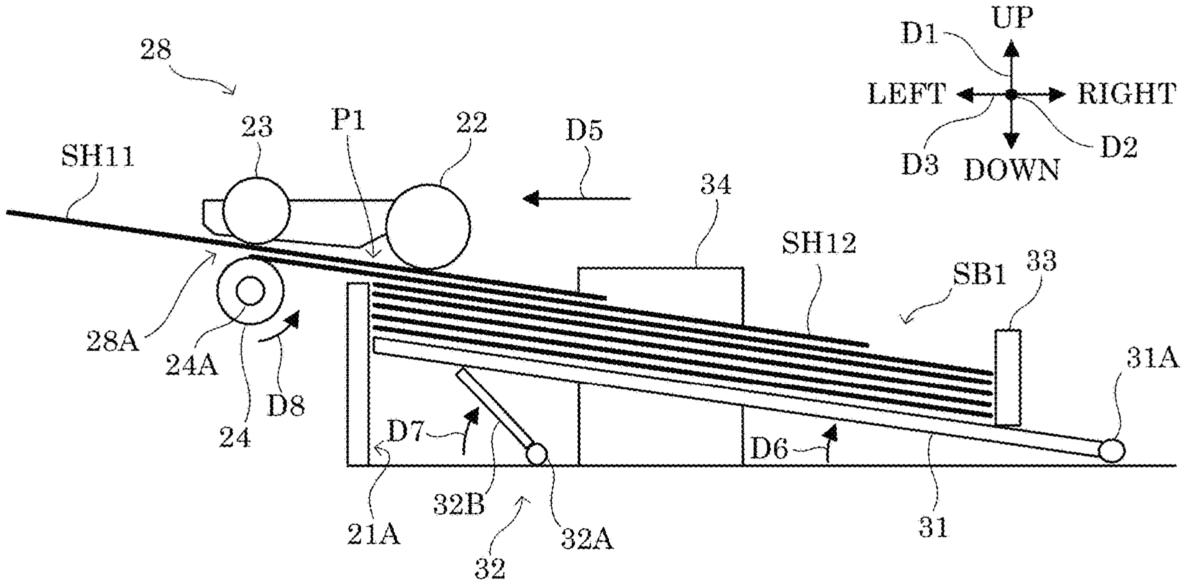
FIG. 9 is a diagram showing the configuration of the sheet supply portion in the image forming apparatus according to the embodiment of the present disclosure.

As shown in FIG. 2 and FIG. 4, the separation roller 24 is provided below the sheet feed roller 23 while opposing the sheet feed roller 23. The separation roller 24 forms the separation portion 28A (see FIG. 4) with the sheet feed roller 23. The separation portion 28A separates, from a sheet SH11 (see FIG. 9) conveyed by the pickup roller 22, another sheet SH12 accompanying the sheet SH11 (see FIG. 9).

Specifically, the separation roller 24 includes a shaft portion 24A (see FIG. 4) extending in the front-rear direction D2. The separation roller 24 is fixed to the shaft portion 24A and rotates integrally with the shaft portion 24A. The shaft portion 24A is rotatably supported by a bearing portion (not shown) provided inside the housing 100A. The bearing portion is biased toward the sheet feed roller 23 side by a bias member (not shown) such as a coil spring provided inside the housing 100A. Thus, the separation roller 24 is biased toward the sheet feed roller 23, and a nip portion, that is, the separation portion 28A that nips the sheet SH1 between the separation roller 24 and the sheet feed roller 23 is formed.

When only one sheet SH1 is present at the separation portion 28A, the separation roller 24 rotates by being driven in a rotation direction D8 shown in FIG. 4 by a force transmitted from the sheet SH1 conveyed by the sheet feed roller 23. Further, when the sheets SH11 and SH12 (see FIG.

9) are present at the separation portion 28A, the rotation of the separation roller 24 in the rotation direction D8 is restricted. For example, the sheet supply portion 28 includes a torque limiter that restricts the rotation of the shaft portion 24A in the rotation direction D8 when a torque along the rotation direction D8, that is transmitted to the shaft portion 24A, is less than a predetermined first threshold value. By restricting the rotation of the separation roller 24 in the rotation direction D8 when the sheets SH11 and SH12 are present at the separation portion 28A, the movement of the sheet SH12 in contact with the separation roller 24 in the sheet conveying direction D5 is restricted by contact friction with the separation roller 24. Thus, the another sheet SH12 that moves together with the sheet SH11 along with the conveyance of the sheet SH11 in contact with the pickup roller 22 is separated from the sheet SH11.

As shown in FIG. 2, the sheet sensor 25 is provided more on the downstream side of the sheet conveying direction D5 than the sheet feed roller 23. The sheet sensor 25 detects the sheet SH1 supplied by the sheet supply portion 28 on the conveying path 27. For example, the sheet sensor 25 includes an actuator that is moved by coming into contact with the sheet SH1 and a reflective or transmissive optical sensor that detects a movement of the actuator. In the image forming apparatus 100, a supply timing of the next sheet SH1 by the sheet supply portion 28 is determined based on a detection timing of the sheet SH1 by the sheet sensor 25. The sheet sensor 25 is an example of a detection portion according to the present disclosure.

The drawing sensor 26 detects drawing out of the sheet feed cassette 21 from the housing 100A. For example, the drawing sensor 26 includes a push switch that changes from an on state to an off state in accordance with the drawing out of the sheet feed cassette 21 from the housing 100A.

Incidentally, a sheet conveying device that uses the sheet sensor 25 to measure a conveying speed of the sheet SH1 by the sheet supply portion 28 is known.

Herein, in the image forming apparatus 100, a delay may occur in the supply of the sheet SH1 by the sheet supply portion 28. However, in the past, there has been no technology for determining whether or not a delay has occurred in the supply of the sheet SH1 by the sheet supply portion 28 without using an additional sensor.

In contrast, in the image forming apparatus 100 according to the embodiment of the present disclosure, it is possible to determine whether or not a delay has occurred in the supply of the sheet SH1 by the sheet supply portion 28 without using an additional sensor as will be described below.

[Configuration of Control Portion 7]

Next, a configuration of the control portion 7 will be described with reference to FIG. 3.

As shown in FIG. 3, the control portion 7 includes a displacement processing portion 41, a measurement processing portion 42, a first determination processing portion 43, a second determination processing portion 44, an acquisition processing portion 45, and a notification processing portion 46. A device including the sheet feed portion 4 and the control portion 7 is an example of a sheet conveying device according to the present disclosure.

Specifically, a sheet feed control program for causing the CPU 11 of the control portion 7 to execute reset processing (see flowchart shown in FIG. 5) and sheet feed processing (see flowchart shown in FIG. 6) to be described later is stored in advance in the ROM 12 of the control portion 7. It is noted that the sheet feed control program may be recorded on a computer-readable recording medium such as a CD, a DVD, and a flash memory so as to be read from the recording medium to be installed in a storage device such as the storage portion 6.

Then, the control portion 7 uses the CPU 11 to execute the sheet feed control program stored in the ROM 12, to thus function as the respective processing portions described above.

It is noted that some or all of the processing portions included in the control portion 7 may be constituted of electronic circuits. Alternatively, the sheet feed control program may be a program for causing a plurality of processors to function as the respective processing portions included in the control portion 7.

When a predetermined specific timing arrives, the displacement processing portion 41 displaces the stack of sheets SB1 placed in the sheet feed cassette 21 to a position at which the stack of sheets SB1 comes into contact with the pickup roller 22 using the lift plate 31.

For example, the specific timing is a first execution timing of image forming processing after the sheet feed cassette 21 is drawn out from the housing 100A. It is noted that the image forming processing is processing of forming an image on the sheet SH1 supplied by the sheet feed portion 4 using the image forming portion 3.

The measurement processing portion 42 measures an elapsed time from the start of supply of the sheet SH1 by the sheet supply portion 28 to the time when the sheet SH1 is detected by the sheet sensor 25 every time the sheet SH1 is supplied by the sheet supply portion 28.

In the image forming apparatus 100, a sheet SH3 (see FIG. 4) below the sheet SH2 (see FIG. 4) to be conveyed by the pickup roller 22 may be pulled by the sheet SH2 to be fed out from the stack of sheets SB1 (see FIG. 4). That is, the sheet SH3 to be conveyed next by the pickup roller 22 may move toward the downstream side of the sheet conveying direction D5 from a reference position P1 (see FIG. 4). The reference position P1 is a position at which a tip end of the uppermost sheet SH1 in the stack of sheets SB1 is arranged when the stack of sheets SB1 is lifted by the lift plate 31.

When the sheet SH3 to be next conveyed by the pickup roller 22 is being fed out from the stack of sheets SB1, the measurement time measured by the measurement processing portion 42 during the conveyance of the sheet SH3 becomes shorter than that of a case where the sheet SH3 is not being fed out from the stack of sheets SB1. In other words, when the measurement time measured by the measurement processing portion 42 is less than a predetermined reference time, it is possible to determine that the sheet SH3 conveyed at the time of measuring the measurement time has been fed out from the stack of sheets SB1. Further, when the measurement time measured by the measurement processing portion 42 is equal to or longer than the reference time, it is possible to determine that the sheet SH3 conveyed at the time of measuring the measurement time has not been fed out from the stack of sheets SB1.

The first determination processing portion 43 determines whether or not the measurement time measured by the measurement processing portion 42 is less than the reference time every time the elapsed time is measured by the measurement processing portion 42. In other words, the first determination processing portion 43 determines whether or not the sheet SH1 conveyed at the time of measuring the measurement time has been fed out from the stack of sheets SB1.

Herein, the reference time is set in advance based on a design value of the conveying speed of the sheet SH1 by the sheet supply portion 28 and a specific conveying distance from the reference position P1 (see FIG. 4) to the detection position. The specific conveying distance is a distance from the reference position P1 to the detection position on the conveying path of the sheet SH1. The reference time is stored in advance in the storage portion 6 or the ROM 12. It is noted that the reference time may be set based on the specific conveying distance and an average value of conveying speeds of the sheet SH1 by the sheet supply portion 28 that is measured when conveying the sheet SH1 for the first time after the specific timing arrives.

When the sheet SH1 conveyed at the time of measuring the measurement time has not been fed out from the stack of sheets SB1, it is possible to determine whether or not a delay has occurred in the supply of the sheet SH1 by the sheet supply portion 28 based on the measurement time and the reference time.

On the other hand, when the sheet SH1 conveyed at the time of measuring the measurement time has been fed out from the stack of sheets SB1, it is not possible to determine whether or not a delay has occurred in the supply of the sheet SH1 by the sheet supply portion 28 based on the measurement time and the reference time.

Figure 8:
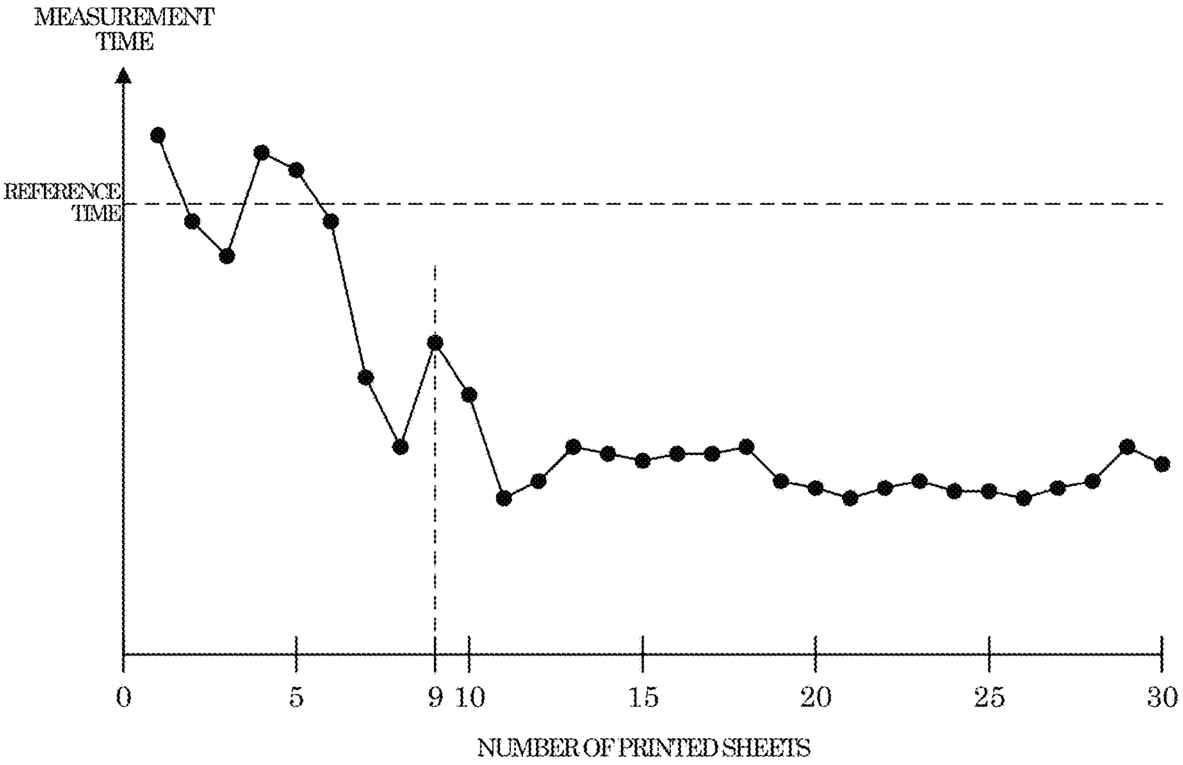
FIG. 8 is a diagram showing an example of a transition of a measurement time measured in the image forming apparatus according to the embodiment of the present disclosure.

Herein, FIG. 8 shows an example of a transition of the measurement time measured by the measurement processing portion 42. Specifically, FIG. 8 shows an example of the transition of the measurement time from the arrival of the specific timing until the number of printed sheets reaches 30 sheets.

As shown in FIG. 8, the pay-out of the sheet SH1 from the stack of sheets SB1 is likely to occur continuously. In addition, a pay-out amount of the sheet SH1 from the stack of sheets SB1 during a period in which the pay-out of the sheet SH1 from the stack of sheets SB1 is occurring continuously gradually increases as the number of printed sheets increases since the pay-out.

Herein, when the pickup roller 22 slips and a delay occurs in the supply of the sheet SH1 by the sheet supply portion 28 during the period in which the pay-out of the sheet SH1 from the stack of sheets SB1 is occurring continuously, for example, the measurement time becomes longer than the measurement time that has been measured during the previous sheet feed with no delay (see the ninth sheet in FIG. 8). In other words, it is possible to determine whether or not a delay has occurred in the supply of the sheet SH1 by the sheet supply portion 28 based on the measurement time measured during the period in which the pay-out of the sheet SH1 from the stack of sheets SB1 is occurring continuously.

It is noted that when the specific timing arrives, the uppermost sheet SH1 in the stack of sheets SB1 stored in the sheet feed cassette 21 is arranged at the reference position P1 (see FIG. 4). Therefore, as shown in FIG. 8, the measurement time that is measured for the first time after the arrival of the specific timing does not become less than the reference time.

The second determination processing portion 44 determines, when it is continuously determined by the first determination processing portion 43 that the measurement time is less than the reference time, whether or not a delay has occurred in the supply of the sheet SH1 by the sheet supply portion 28 based on a first measurement time that has been measured last out of a plurality of the measurement times that have been measured after a time when it has been lastly determined by the first determination processing portion 43 that the measurement time is not less than the reference time and a second measurement time that is the shortest out of the rest of the measurement times excluding the first measurement time.

Specifically, when the first measurement time is longer than the second measurement time, the second determination processing portion 44 determines that a delay has occurred in the supply of the sheet SH1 by the sheet supply portion 28. Further, when the first measurement time is equal to or shorter than the second measurement time, the second determination processing portion 44 determines that no delay has occurred in the supply of the sheet SH1 by the sheet supply portion 28.

The acquisition processing portion 45 acquires, when it is determined by the second determination processing portion 44 that a delay has occurred in the supply of the sheet SH1 by the sheet supply portion 28, a difference between the first measurement time and the second measurement time as a delay amount in the supply of the sheet SH1, and acquires, when it is determined by the first determination processing portion 43 that the measurement time is not less than the reference time, a difference between the measurement time that has been measured last and the reference time as the delay amount.

When the delay amount acquired by the acquisition processing portion 45 exceeds a predetermined second threshold value, the notification processing portion 46 notifies to that effect.

For example, when the delay amount acquired by the acquisition processing portion 45 exceeds the second threshold value and a predetermined notification condition is satisfied, the notification processing portion 46 notifies that the delay amount in the supply of the sheet SH1 by the sheet supply portion 28 has exceeded the second threshold value.

For example, the determination condition is a condition in which a frequency of occurrence of a supply delay in which the delay amount exceeds the second threshold value exceeds a predetermined value. It is noted that the determination condition may alternatively be a condition in which a supply delay in which the delay amount exceeds the second threshold value occurs continuously for a predetermined number of times. Furthermore, the notification processing portion 46 may unconditionally notify that the delay amount in the supply of the sheet SH1 by the sheet supply portion 28 has exceeded the second threshold value when the delay amount acquired by the acquisition processing portion 45 exceeds the second threshold value.

For example, when the delay amount acquired by the acquisition processing portion 45 exceeds the second threshold value and the notification condition is satisfied, the notification processing portion 46 causes the operation display portion 5 to display a notification screen that includes a message indicating that the delay amount in the supply of the sheet SH1 by the sheet supply portion 28 has exceeded the second threshold value. It is noted that the notification screen may include a message that prompts maintenance of the sheet supply portion 28.

[Reset Processing]

Figure 5:
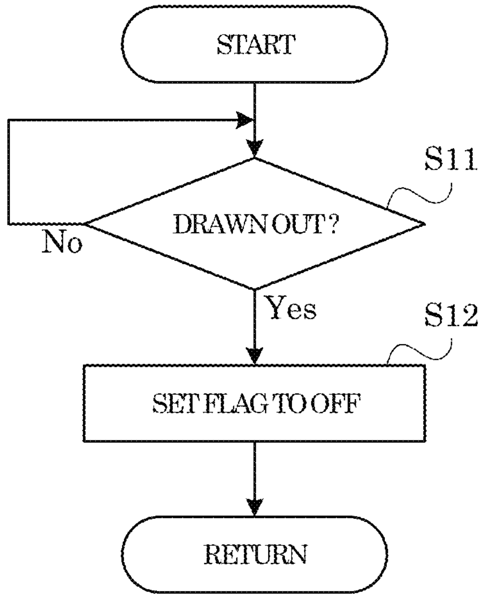
FIG. 5 is a flowchart showing an example of reset processing executed in the image forming apparatus according to the embodiment of the present disclosure.

Hereinafter, exemplary procedures of the reset processing executed by the control portion 7 in the image forming apparatus 100 will be described with reference to FIG. 5. Herein, Step S11, Step S12, . . . represent numbers of processing procedures (steps) executed by the control portion 7.

<Step S11>

First, in Step S11, the control portion 7 determines whether or not the sheet feed cassette 21 has been drawn out from the housing 100A.

Specifically, when a detection signal indicating that the sheet feed cassette 21 has been drawn out is output from the drawing sensor 26, the control portion 7 determines that the sheet feed cassette 21 has been drawn out from the housing 100A.

Herein, when determining that the sheet feed cassette 21 has been drawn out from the housing 100A (Yes in S11), the control portion 7 shifts the processing to Step S12. On the other hand, when determining that the sheet feed cassette 21 has not been drawn out from the housing 100A (No in S11), the control portion 7 waits for the sheet feed cassette 21 to be drawn out from the housing 100A in Step S11.

When the sheet feed cassette 21 is drawn out from the housing 100A, the engagement between the rotation shaft 32A and the joint portion is released, and the lift plate 31 descends by its own weight.

<Step S12>

In Step S12, the control portion 7 sets a predetermined flag to OFF.

Specifically, in the image forming apparatus 100, a first storage area used for setting the flag is provided in advance in the storage portion 6. A value of “0” or “1” is stored in the first storage area. The control portion 7 stores the value of “0” in the first storage area to set the flag to OFF.

[Sheet Feed Processing]

Figure 6:
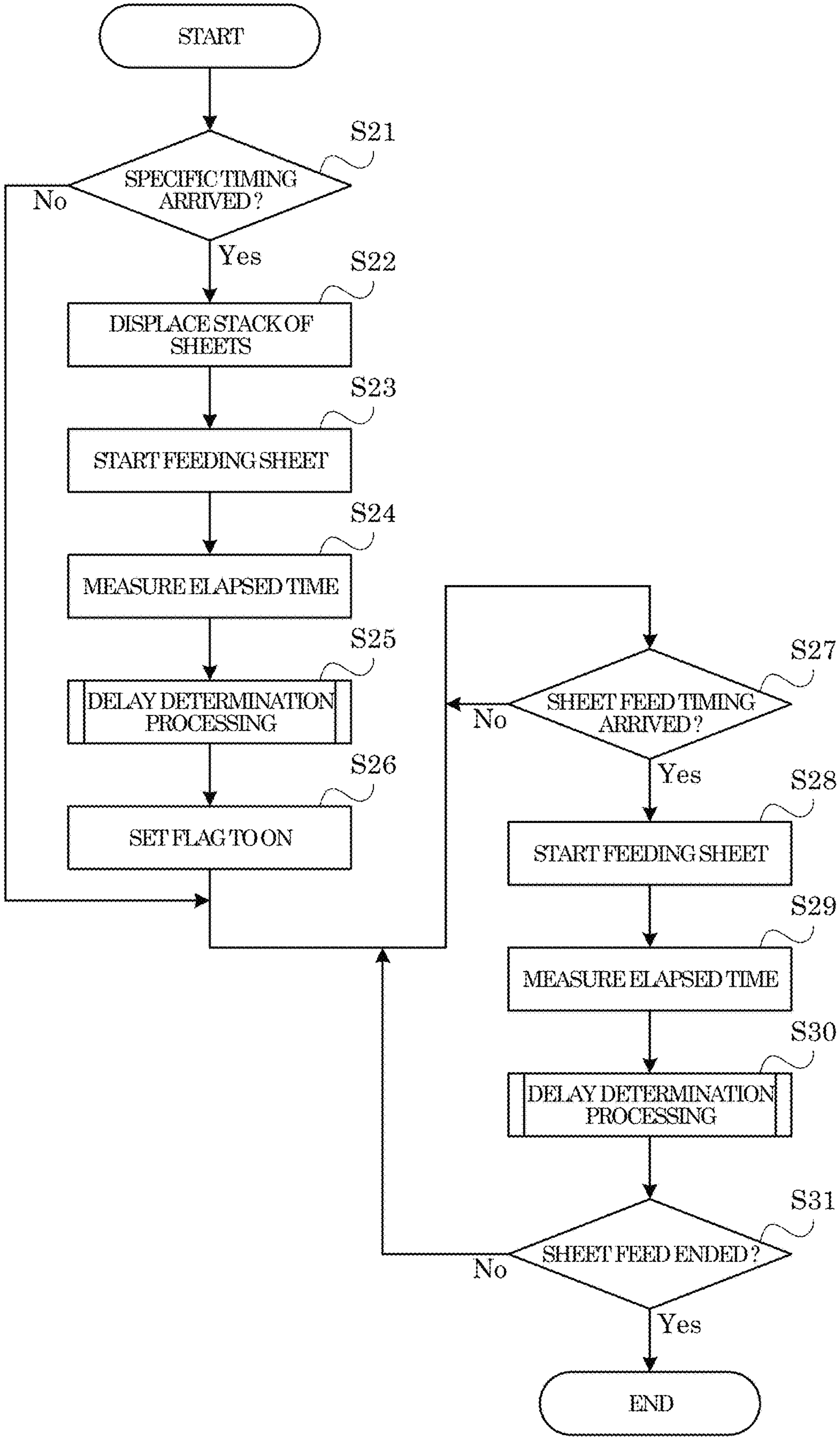
FIG. 6 is a flowchart showing an example of sheet feed processing executed in the image forming apparatus according to the embodiment of the present disclosure.

Next, with reference to FIG. 6, a determination method according to the present disclosure will be described along with exemplary procedures of the sheet feed processing executed by the control portion 7 in the image forming apparatus 100. It is noted that the sheet feed processing is executed when the execution timing of the image forming processing arrives.

<Step S21>

First, in Step S21, the control portion 7 determines whether or not the specific timing has arrived.

Specifically, the control portion 7 determines that the specific timing has arrived when the flag is set to OFF.

Herein, when determining that the specific timing has arrived (Yes in S21), the control portion 7 shifts the processing to Step S22. On the other hand, when determining that the specific timing has not arrived (No in S21), the control portion 7 shifts the processing to Step S27.

<Step S22>

In Step S22, the control portion 7 uses the lift plate 31 to displace the stack of sheets SB1 placed in the sheet feed cassette 21 to a position at which the stack of sheets SB1 comes into contact with the pickup roller 22. The processing of Step S22 is executed by the displacement processing portion 41 of the control portion 7.

<Step S23>

In Step S23, the control portion 7 causes the sheet supply portion 28 to start supplying the sheet SH1.

An image that is based on image data is formed on the sheet SH1 fed by the processing of Step S23 by the image forming portion 3.

<Step S24>

In Step S24, the control portion 7 measures the elapsed time from the start of supply of the sheet SH1 by the sheet supply portion 28 to the time when the sheet SH1 is detected by the sheet sensor 25. The processing of Step S24 is an example of a measurement step according to the present disclosure and is executed by the measurement processing portion 42 of the control portion 7.

Herein, the sheet SH1 to be fed in the processing of Step S23 is the first sheet SH1 that is conveyed after the sheet feed cassette 21 is drawn out from the housing 100A and the stack of sheets SB1 is set in the sheet feed cassette 21. In other words, a sheet feed start position of the sheet SH1 to be fed in the processing of Step S23 is the reference position P1 (see FIG. 4).

<Step S25>

In Step S25, the control portion 7 executes delay determination processing to be described later.

<Step S26>

In Step S26, the control portion 7 sets the flag to ON.

Specifically, the control portion 7 stores the value of “1” in the first storage area to set the flag to ON. Thus, the processing from Step S22 to Step S26 is omitted until the sheet feed cassette 21 is drawn out from the housing 100A.

<Step S27>

In Step S27, the control portion 7 determines whether or not a sheet feed timing of the sheet SH1 has arrived.

Specifically, when the sheet SH1 has not been fed after the start of the sheet feed processing, the control portion 7 determines that the sheet feed timing has arrived at the start of the processing of Step S27. Further, when the sheet SH1 has been fed after the start of the sheet feed processing, the control portion 7 determines that the sheet feed timing has arrived when a predetermined time has elapsed since the last detection of the sheet SH1 by the sheet sensor 25.

Herein, when determining that the sheet feed timing has arrived (Yes in S27), the control portion 7 shifts the processing to Step S28. On the other hand, when determining that the sheet feed timing has not arrived (No in S27), the control portion 7 waits for the sheet feed timing to arrive in Step S27.

<Step S28>

In Step S28, the control portion 7 causes the sheet supply portion 28 to start supplying the sheet SH1.

An image that is based on image data is formed on the sheet SH1 fed by the processing of Step S28 by the image forming portion 3.

<Step S29>

In Step S29, the control portion 7 measures the elapsed time from the start of supply of the sheet SH1 by the sheet supply portion 28 to the time when the sheet SH1 is detected by the sheet sensor 25. The processing of Step S29 is an example of the measurement step according to the present disclosure and is executed by the measurement processing portion 42 of the control portion 7.

<Step S30>

In Step S30, the control portion 7 executes the delay determination processing to be described later.

<Step S31>

In Step S31, the control portion 7 determines whether or not the sheet feed of the sheet SH1 has ended.

Specifically, the control portion 7 determines that the sheet feed of the sheet SH1 has ended when all of the sheets SH1 on which images are to be formed by the image forming processing have been fed.

Herein, when determining that the sheet feed of the sheet SH1 has ended (Yes in S31), the control portion 7 ends the sheet feed processing. On the other hand, when determining that the sheet feed of the sheet SH1 has not ended (No in S31), the control portion 7 shifts the processing to Step S27.

[Delay Determination Processing]

Figure 7:
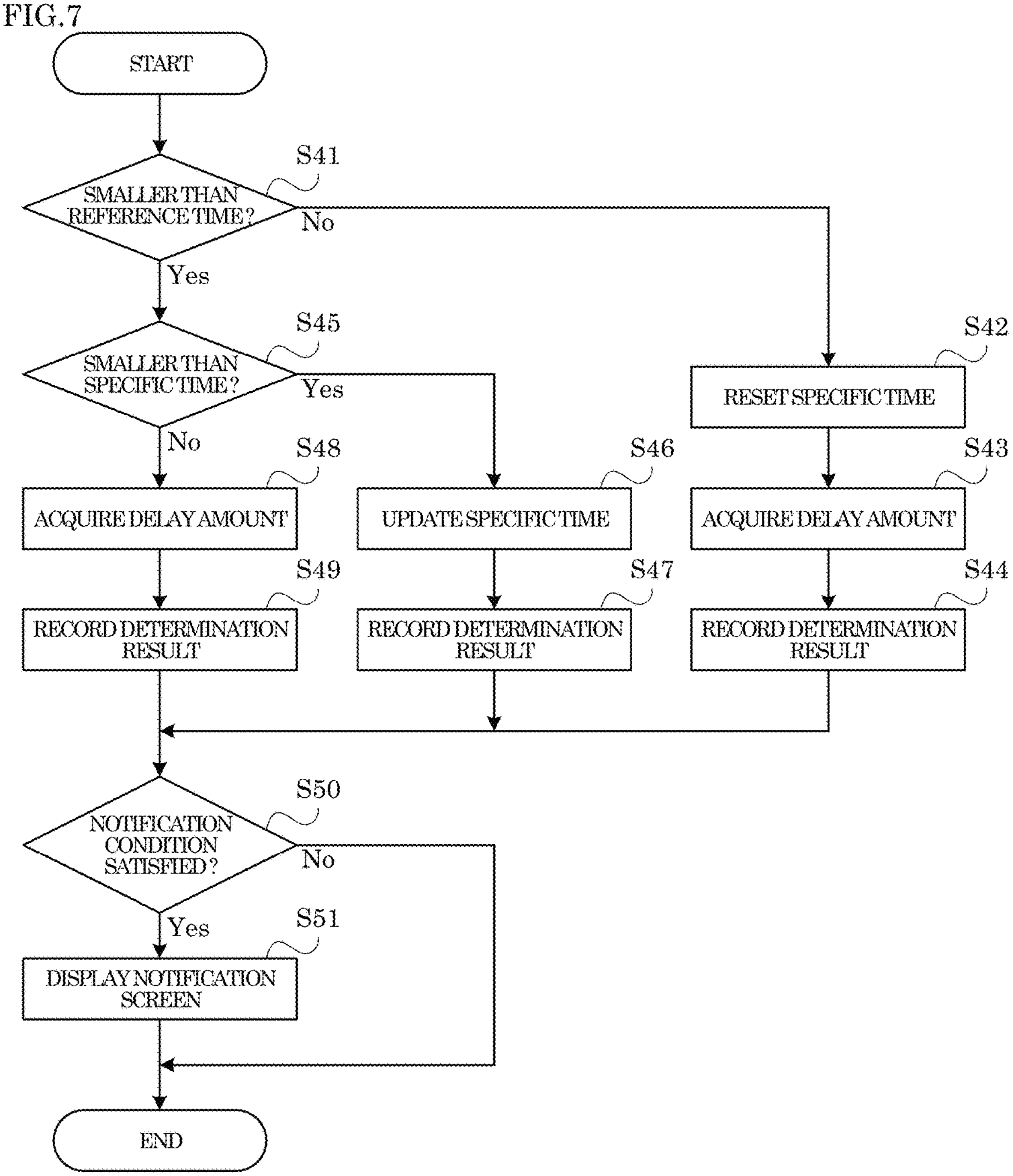
FIG. 7 is a flowchart showing an example of delay determination processing executed in the image forming apparatus according to the embodiment of the present disclosure.

Next, the delay determination processing executed in Step S25 and Step S30 in the sheet feed processing will be described with reference to FIG. 7.

<Step S41>

First, in Step S41, the control portion 7 determines whether or not the measurement time that has been measured last is less than the reference time. The processing of Step S41 is an example of a first determination step according to the present disclosure and is executed by the first determination processing portion 43 of the control portion 7.

Herein, when determining that the measurement time that has been measured last is less than the reference time (Yes in S41), the control portion 7 shifts the processing to Step S45. On the other hand, when determining that the measurement time that has been measured last is not less than the reference time (No in S41), the control portion 7 shifts the processing to Step S42.

<Step S42>

In Step S42, the control portion 7 resets the specific time to the reference time, which is an initial value. The specific time is used in the determination by the second determination processing portion 44.

<Step S43>

In Step S43, the control portion 7 acquires the difference between the measurement time that has been measured last and the reference time as the delay amount. The processing of Step S43 is executed by the acquisition processing portion 45 of the control portion 7.

<Step S44>

In Step S44, the control portion 7 records the determination result as to whether or not a delay has occurred in the supply of the sheet SH1 by the sheet supply portion 28.

Specifically, in the image forming apparatus 100, a second storage area used for recording the determination result as to whether or not a delay has occurred in the supply of the sheet SH1 by the sheet supply portion 28 is provided in advance in the storage portion 6. The control portion 7 records the determination result by storing, in the second storage area, information indicating that a delay has occurred in the supply of the sheet SH1 by the sheet supply portion 28 and the delay amount acquired by the processing of Step S43 in association with the supply time of the sheet SH1.

<Step S45>

In Step S45, the control portion 7 determines whether or not the measurement time that has been measured last is less than the specific time. The processing of Step S45 is an example of a second determination step according to the present disclosure and is executed by the second determination processing portion 44 of the control portion 7.

Herein, when determining that the measurement time that has been measured last is less than the specific time (Yes in S45), the control portion 7 shifts the processing to Step S46. On the other hand, when determining that the measurement time that has been measured last is not less than the specific time (No in S45), the control portion 7 shifts the processing to Step S48.

<Step S46>

In Step S46, the control portion 7 updates the specific time so that the specific time becomes the measurement time that has been measured last. Thus, when it is continuously determined by the first determination processing portion 43 that the measurement time is less than the reference time, the shortest time out of the plurality of measurement times that have been measured after the time when it has been lastly determined by the first determination processing portion 43 that the measurement time is not less than the reference time is set as the specific time. Therefore, when the processing of Step S45 is executed next time, the specific time can be handled as the second measurement time.

<Step S47>

In Step S47, the control portion 7 records the determination result as to whether or not a delay has occurred in the supply of the sheet SH1 by the sheet supply portion 28.

Specifically, the control portion 7 records the determination result by storing information indicating that no delay has occurred in the supply of the sheet SH1 by the sheet supply portion 28 in the second storage area in association with the supply time of the sheet SH1.

<Step S48>

In Step S48, the control portion 7 acquires the difference between the measurement time that has been measured last and the specific time as the delay amount. The processing of Step S48 is executed by the acquisition processing portion 45 of the control portion 7.

<Step S49>

In Step S49, the control portion 7 records the determination result as to whether or not a delay has occurred in the supply of the sheet SH1 by the sheet supply portion 28.

Specifically, the control portion 7 records the determination result by storing information indicating that a delay has occurred in the supply of the sheet SH1 by the sheet supply portion 28 and the delay amount acquired by the processing of Step S48 in the second storage area in association with the supply time of the sheet SH1.

<Step S50>

In Step S50, the control portion 7 determines whether or not the notification condition is satisfied.

For example, the control portion 7 determines that the notification condition is satisfied when the number of times the delay amount has exceeded the second threshold value exceeds a predetermined number of times within the most recent 100 times of sheet feed.

Herein, when determining that the notification condition is satisfied (Yes in S50), the control portion 7 shifts the processing to Step S51. On the other hand, when determining that the notification condition is not satisfied (No in S50), the control portion 7 ends the delay determination processing.

<Step S51>

In Step S51, the control portion 7 causes the operation display portion 5 to display the notification screen. The processing of Step S51 is executed by the notification processing portion 46 of the control portion 7.

Thus, it is possible for a user of the image forming apparatus 100 to recognize the functional deterioration of the sheet supply portion 28. It is noted that the control portion 7 may stop the conveyance of the sheet SH1 until a user operation is accepted on the operation display portion 5.

In this manner, in the image forming apparatus 100, when it is continuously determined by the first determination processing portion 43 that the measurement time is less than the reference time, it is possible to determine whether or not a delay has occurred in the supply of the sheet SH1 by the sheet supply portion 28 based on the first measurement time and the second measurement time out of the plurality of measurement times that have been measured after the time when it has been lastly determined by the first determination processing portion 43 that the measurement time is not less than the reference time.

It is noted that the lift plate 31 may be configured to descend every time the image forming processing ends. In this case, when the sheet SH1 fed out from the stack of sheets SB1 returns to the reference position P1 by its own weight, a reverse rotation of the pickup roller 22 and the sheet feed roller 23, or the like while the lift plate 31 descends, the specific timing may be the execution timing of the image forming processing.

Furthermore, the lift portion according to the present disclosure is not limited to a flat plate-like member and only needs to be a member including a support surface that supports a bottom surface of the stack of sheets SB1. In addition, the conveying member according to the present disclosure is not limited to a roller-type member and may alternatively be a belt-like member.

Moreover, the present disclosure may also be applied to an inkjet-type image forming apparatus.

Furthermore, the present disclosure may also be applied to the ADF 1.

NOTES OF DISCLOSURE

Hereinafter, a general outline of the disclosure extracted from the embodiment described above will be noted. It is noted that the respective configurations and processing functions described in the notes below can be sorted and arbitrarily combined as appropriate.

Note 1

A sheet conveying device, including: a lift portion which lifts a stack of sheets; a sheet supply portion which includes a conveying member which rotates while being in contact with an upper surface of the stack of sheets lifted by the lift portion, and supplies a sheet that comes into contact with the conveying member to a conveying path; a detection portion which detects the sheet supplied by the sheet supply portion on the conveying path; a measurement processing portion which measures, every time the sheet is supplied by the sheet supply portion, an elapsed time from a start of supply of the sheet by the sheet supply portion to a time when the sheet is detected by the detection portion; a first determination processing portion which determines, every time the elapsed time is measured by the measurement processing portion, whether or not a measurement time measured by the measurement processing portion is less than a predetermined reference time; and a second determination processing portion which determines, when it is continuously determined by the first determination processing portion that the measurement time is less than the reference time, whether or not a delay has occurred in the supply of the sheet by the sheet supply portion based on a first measurement time that has been measured last out of a plurality of the measurement times that have been measured after a time when it has been lastly determined by the first determination processing portion that the measurement time is not less than the reference time and a second measurement time that is shortest out of rest of the measurement times excluding the first measurement time.

Note 2

The sheet conveying device according to note 1, including: an acquisition processing portion which acquires, when it is determined by the second determination processing portion that a delay has occurred in the supply of the sheet by the sheet supply portion, a difference between the first measurement time and the second measurement time as a delay amount of the supply of the sheet, and acquires, when it is determined by the first determination processing portion that the measurement time is not less than the reference time, a difference between the measurement time that has been measured last and the reference time as the delay amount; and a notification processing portion which, when the delay amount acquired by the acquisition processing portion exceeds a predetermined threshold value, notifies to that effect.

Note 3

An image forming apparatus, including: the sheet conveying device according to note 1 or 2; and an image forming portion which forms an image on the sheet conveyed by the sheet conveying device.

Note 4

A determination method executed in a sheet conveying device including a lift portion which lifts a stack of sheets, a sheet supply portion which includes a conveying member which rotates while being in contact with an upper surface of the stack of sheets lifted by the lift portion, and supplies a sheet that comes into contact with the conveying member to a conveying path, and a detection portion which detects the sheet supplied by the sheet supply portion on the conveying path, the determination method including: a measurement step of measuring, every time the sheet is supplied by the sheet supply portion, an elapsed time from a start of supply of the sheet by the sheet supply portion to a time when the sheet is detected by the detection portion; a first determination step of determining, every time the elapsed time is measured in the measurement step, whether or not a measurement time measured in the measurement step is less than a predetermined reference time; and a second determination step of determining, when it is continuously determined in the first determination step that the measurement time is less than the reference time, whether or not a delay has occurred in the supply of the sheet by the sheet supply portion based on a first measurement time that has been measured last out of a plurality of the measurement times that have been measured after a time when it has been lastly determined in the first determination step that the measurement time is not less than the reference time and a second measurement time that is shortest out of rest of the measurement times excluding the first measurement time.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A sheet conveying device, comprising:

a lift portion which lifts a stack of sheets;

a sheet supply portion which includes a conveying member which rotates while being in contact with an upper surface of the stack of sheets lifted by the lift portion, and supplies a sheet that comes into contact with the conveying member to a conveying path;

a detection portion which detects the sheet supplied by the sheet supply portion on the conveying path;

a measurement processing portion which measures, every time the sheet is supplied by the sheet supply portion, an elapsed time from a start of supply of the sheet by the sheet supply portion to a time when the sheet is detected by the detection portion;

a first determination processing portion which determines, every time the elapsed time is measured by the measurement processing portion, whether or not a measurement time measured by the measurement processing portion is less than a predetermined reference time; and a second determination processing portion which determines, when it is continuously determined by the first determination processing portion that the measurement time is less than the reference time, whether or not a delay has occurred in the supply of the sheet by the sheet supply portion based on a first measurement time that has been measured last out of a plurality of the measurement times that have been measured after a time when it has been lastly determined by the first determination processing portion that the measurement time is not less than the reference time and a second measurement time that is shortest out of rest of the measurement times excluding the first measurement time.

2. The sheet conveying device according to claim 1, comprising:

an acquisition processing portion which acquires, when it is determined by the second determination processing portion that a delay has occurred in the supply of the sheet by the sheet supply portion, a difference between the first measurement time and the second measurement time as a delay amount of the supply of the sheet, and acquires, when it is determined by the first determination processing portion that the measurement time is not less than the reference time, a difference between the measurement time that has been measured last and the reference time as the delay amount; and a notification processing portion which, when the delay amount acquired by the acquisition processing portion exceeds a predetermined threshold value, notifies to that effect.

3. An image forming apparatus, comprising:

the sheet conveying device according to claim 1; and an image forming portion which forms an image on the sheet conveyed by the sheet conveying device.

4. A determination method executed in a sheet conveying device including a lift portion which lifts a stack of sheets, a sheet supply portion which includes a conveying member which rotates while being in contact with an upper surface of the stack of sheets lifted by the lift portion, and supplies a sheet that comes into contact with the conveying member to a conveying path, and a detection portion which detects the sheet supplied by the sheet supply portion on the conveying path, the determination method comprising:

a measurement step of measuring, every time the sheet is supplied by the sheet supply portion, an elapsed time from a start of supply of the sheet by the sheet supply portion to a time when the sheet is detected by the detection portion;

a first determination step of determining, every time the elapsed time is measured in the measurement step, whether or not a measurement time measured in the measurement step is less than a predetermined reference time; and a second determination step of determining, when it is continuously determined in the first determination step that the measurement time is less than the reference time, whether or not a delay has occurred in the supply of the sheet by the sheet supply portion based on a first measurement time that has been measured last out of a plurality of the measurement times that have been measured after a time when it has been lastly determined in the first determination step that the measurement time is not less than the reference time and a second measurement time that is shortest out of rest of the measurement times excluding the first measurement time.

* * * * *